June 7, 1932.  W. F. LONBECK  1,862,226
BEAN HARVESTER
Filed Nov. 28, 1930  6 Sheets-Sheet 3

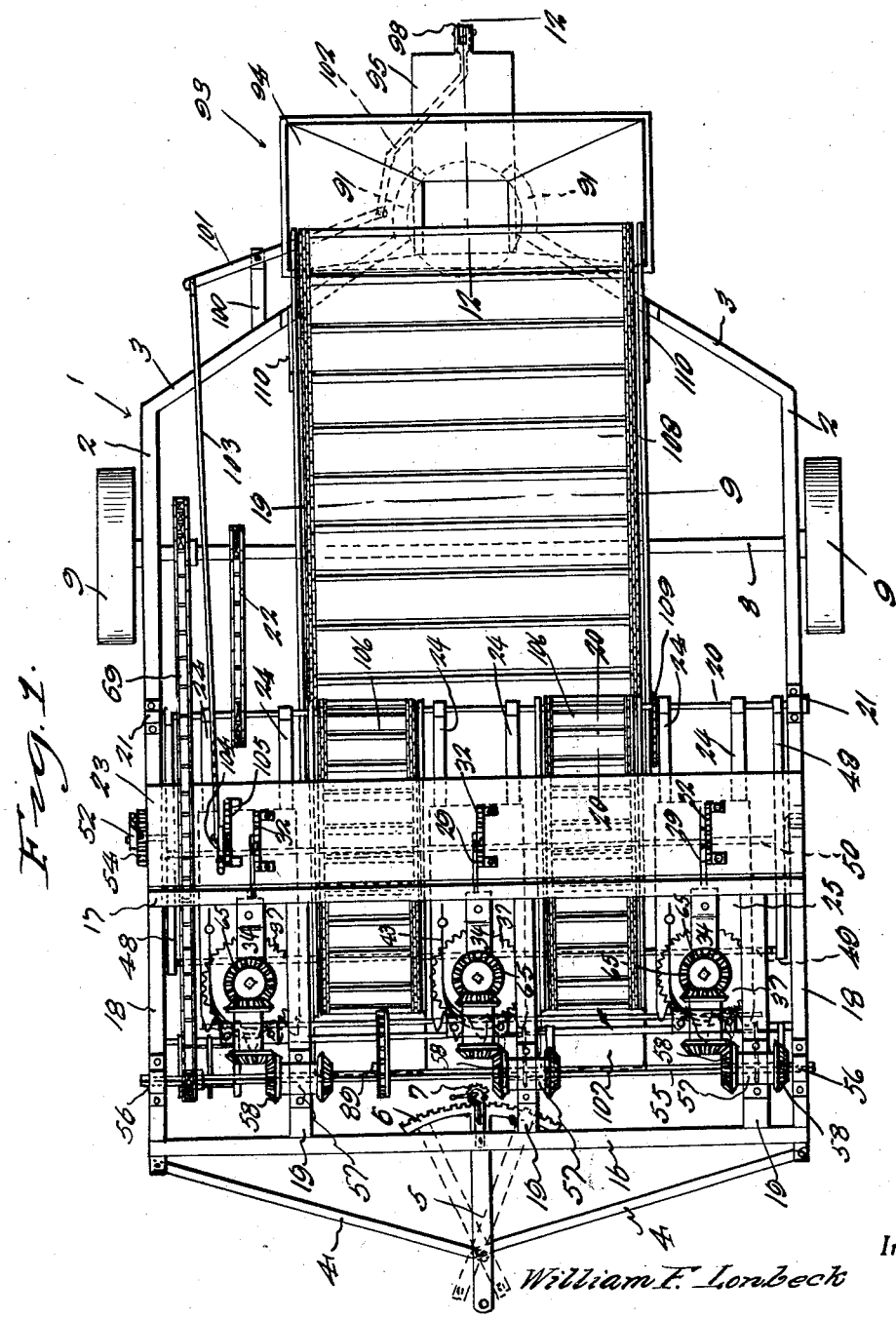

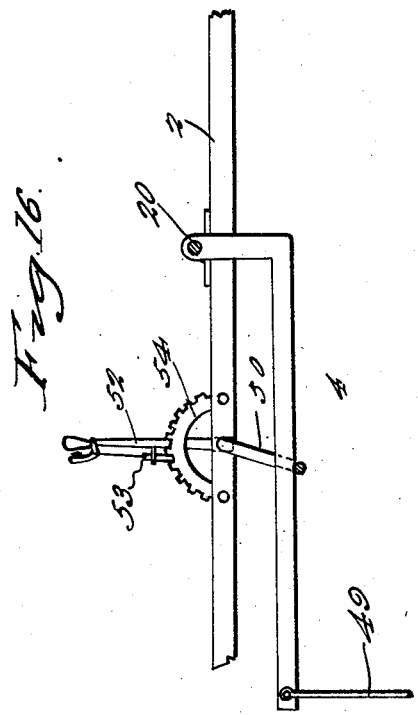
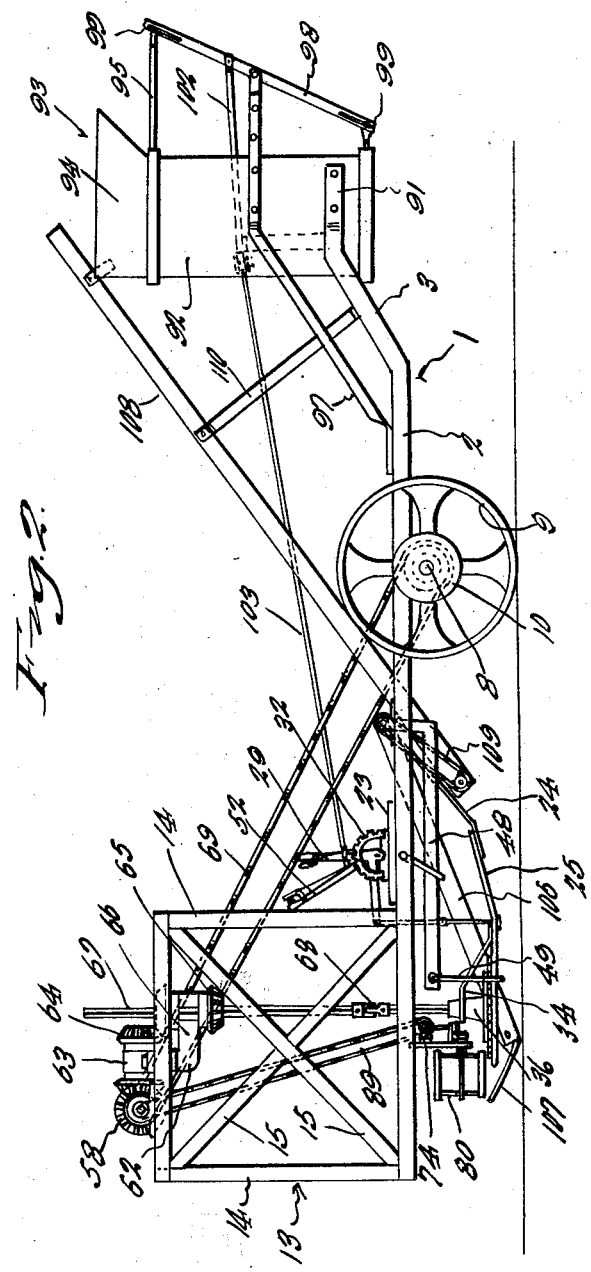

Inventor
William F. Lonbeck

By Clarence A. O'Brien
Attorney

June 7, 1932.  W. F. LONBECK  1,862,226
BEAN HARVESTER
Filed Nov. 28, 1930    6 Sheets-Sheet 4

Inventor
William F. Lonbeck

By Clarence A. O'Brien
Attorney

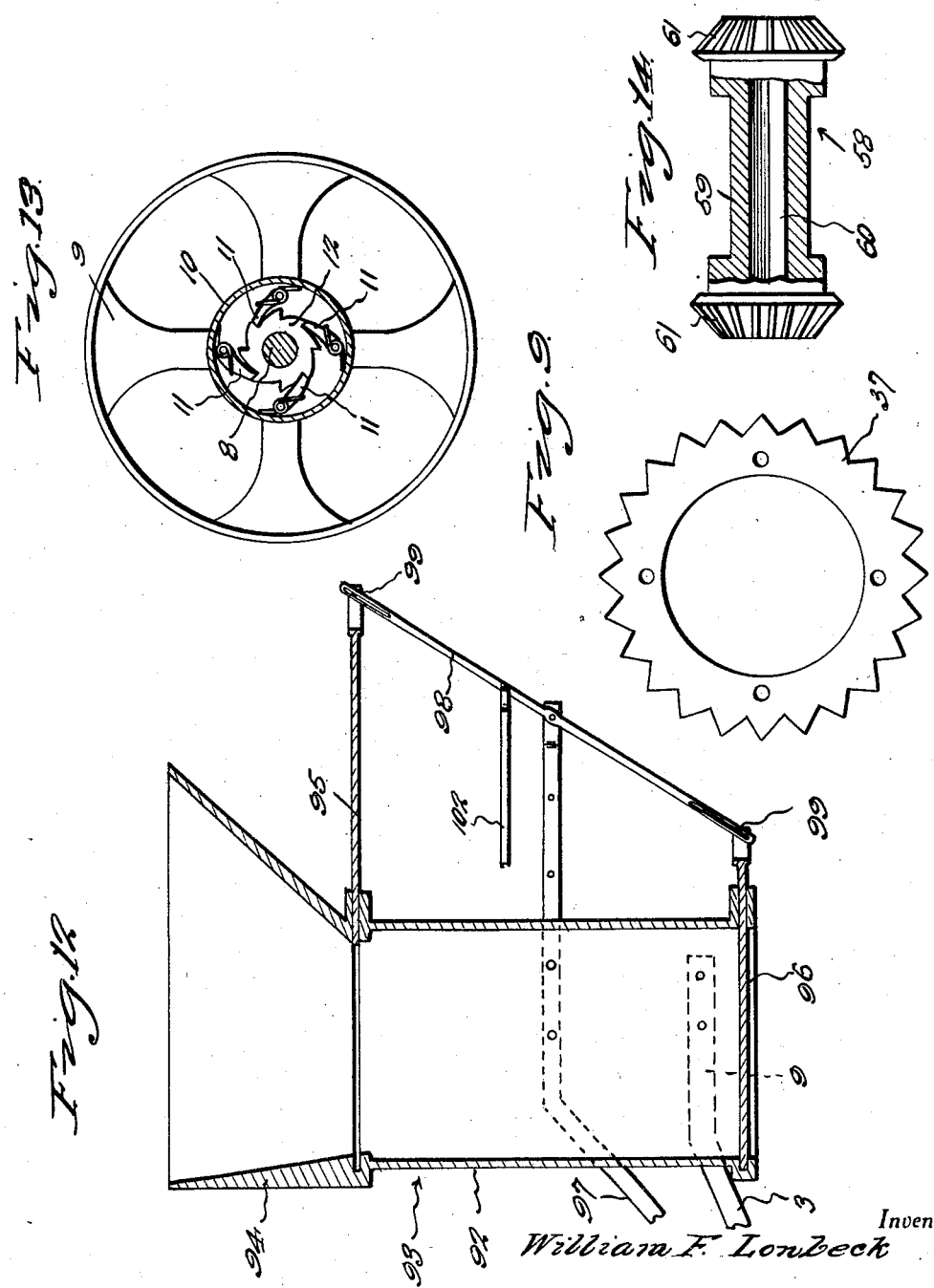

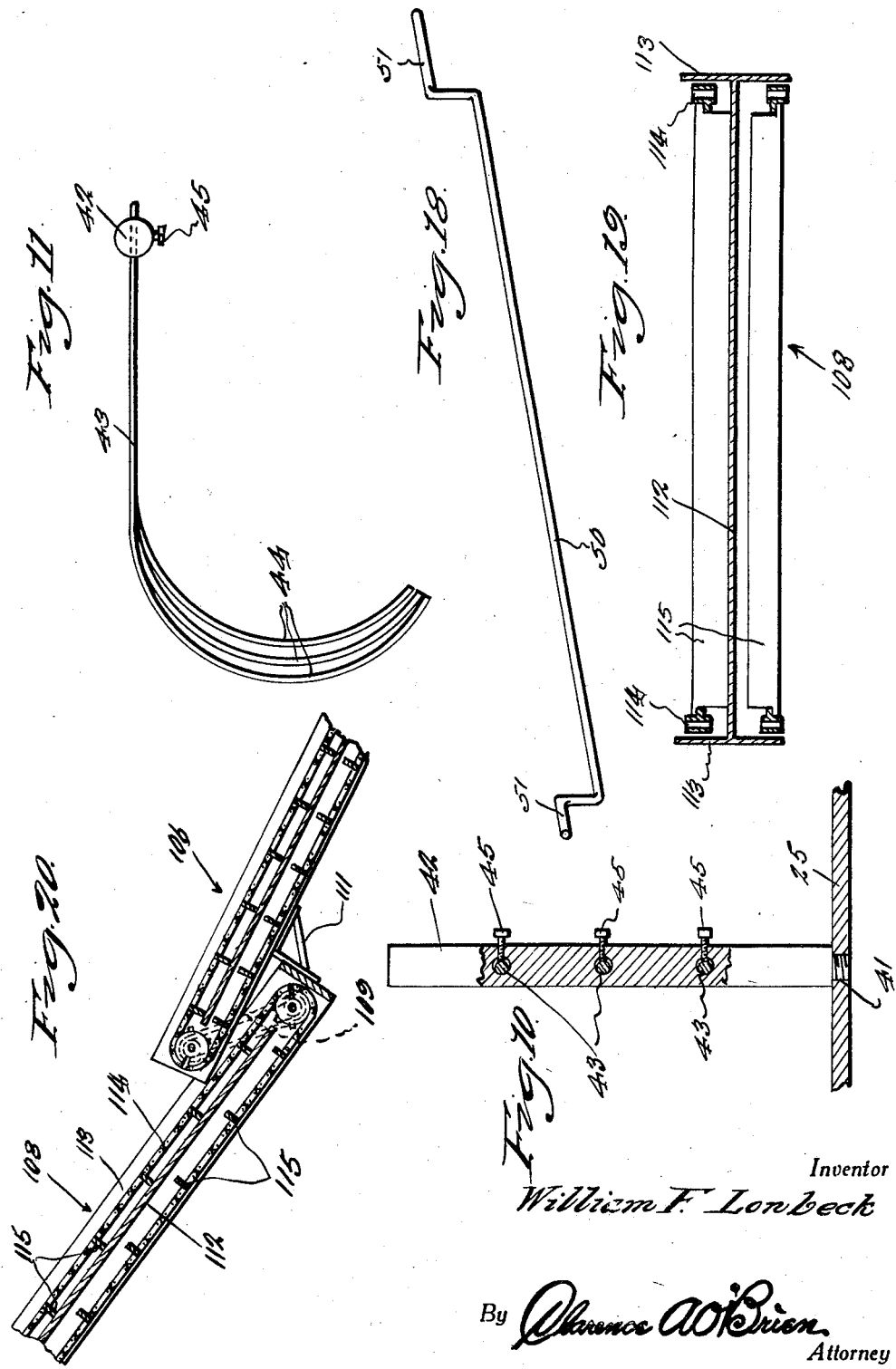

Patented June 7, 1932

1,862,226

UNITED STATES PATENT OFFICE

WILLIAM FRED LONBECK, OF BOONE, COLORADO

BEAN HARVESTER

Application filed November 28, 1930. Serial No. 498,801.

This invention relates generally to agricultural implements or machines and more particularly to new and useful improvements in bean harvesters, but it is understood, of course, that a machine in accordance with this invention may be used for harvesting any kind of crops for which the same may be found adapted and desirable.

An important object of the invention is to provide, in a manner as hereinafter set forth, a machine of the aforementioned character for attachment to a tractor or other draft vehicle and which is adapted to harvest a plurality of rows simultaneously, the machine further including a novel construction and arrangement of parts whereby but two operators will be required, one for the tractor or other draft vehicle and one for the machine constituting this invention.

Another important object of the invention is to provide an agricultural machine of the character described embodying means for cutting the bean stalks comparatively close to the ground and which further includes means for manually adjusting the cutting knives to the desired elevation relative to the ground.

Other objects of the invention are to provide a bean harvester of the character set forth which will be simple in construction, strong, durable, efficient and reliable in operation and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view in top plan of a bean harvester constructed in accordance with this invention.

Figure 2 is a view in side elevation of the machine.

Figure 3 is a cross sectional view through the frame of the machine showing, in front elevation, the cutting units.

Figure 4 is a view in rear elevation showing the reel supporting and driving means.

Figure 5 is a vertical sectional view taken substantially on the line 5—5 of Figure 4.

Figure 6 is a detail view in top plan of one of the cutting units.

Figure 7 is a detail view in vertical longitudinal section through one of the cutting units showing the means for adjustably supporting the same and the manually operable means for independently adjusting each cutting unit, taken substantially on the line 7—7 of Figure 2.

Figure 8 is a detail view in top plan showing one of the cutter supporting plates.

Figure 9 is a detail view in top plan showing one of the toothed annular knives.

Figure 10 is a detail view principally in vertical section on the line 10—10 of Figure 7 showing one of the guard supporting posts.

Figure 11 is a detail view in top plan showing one of the guard supporting posts with the guard fingers mounted thereon.

Figure 12 is a detail view in vertical longitudinal section taken substantially on the line 12—12 of Figure 1.

Figure 13 is a detail view in vertical section showing the means for operatively connecting the supporting wheels to the rotatable axle of the machine.

Figure 14 is a detail view principally in longitudinal section through one of the double beveled gears.

Figure 15 is a detail perspective view showing the device for raising the cutting units simultaneously.

Figure 16 is a detail view in side elevation showing the manually operable means for raising the cutting units simultaneously.

Figure 17 is a detail view in perspective of one of the arms for raising the cutting units simultaneously.

Figure 18 is a detail view in perspective showing the crank rod constituting one of the elements for raising the cutting units simultaneously to which the actuating lever is fixed.

Figure 19 is a detail view in cross section through the main elevator or conveyor taken substantially on the line 19—19 of Figure 1.

Figure 20 is a fragmentary view in vertical longitudinal section taken substantially on the line 20—20 of Figure 1 looking in the direction indicated by the arrow and showing the drive means in broken lines or the main elevator or conveyor.

Referring to the drawings in detail, it will be seen that the reference numeral 1 designates generally a frame which includes the longitudinal side members 2 and the rearwardly converging portions 3. Forwardly converging bars 4 are secured to the forward end portions of the longitudinal side members of the frame and pivotally mounted for swinging movement on the connected forward end portions of the bars 4 is a draw bar 5 for connection with a tractor or other draft implement. A toothed segment 6 is provided on the rear end of the draw bar 5 and is operatively engaged by a crank operated gear 7 for adjusting the draw bar 5 relative to the frame 1. Any suitable latching means may be provided for securing the gear 7 against rotation and for maintaining the draw bar 5 in adjusted position.

An axle 8 is journaled transversely in the frame 1 and has mounted on its end portions the supporting wheels 9. As illustrated to advantage in Figure 13 of the drawings each of the wheels 9 has mounted centrally on its inner side an annular housing 10 in which are pivotally mounted the spring pressed pawls 11 which are engaged with the ratchets 12 fixed on the end portions of the axle 8. The pawls 11 constitute means for operatively connecting the wheels 9 to the axle 8 for driving said axle 8 when the machine is moving forwardly and for permitting independent rotation of the wheels when the machine is moved rearwardly. The pawls 11 also permit one of the wheels to turn slower than the other of said wheels when the machine is turning a corner.

A supporting structure designated generally by the reference numeral 13 (see Figure 2) is mounted on the forward portion of the frame 1 and comprises the uprights 14 and braces 15. The supporting structure 14 further includes the spaced, parallel cross members 16 and 17 and the longitudinal end members 18. Spaced, longitudinally extending bars 19 extend between the cross members 16 and 17 of the supporting structure 13.

A conveyor drive shaft 20 is mounted transversely on the frame 1 forwardly of the axle 8 and has its end portions journaled in suitable bearings 21 on the side members 2 of the frame 1. The conveyor drive shaft 20 is operatively connected to the axle 8 for actuation thereby by a chain and sprocket connection 22. An operator's platform 23 is also mounted transversely on the frame 1 between the supporting structure 13 and the conveyor drive shaft 20.

Pairs of arms 24 are mounted for swinging movement in a vertical plane on the conveyor drive shaft 20 and extend forwardly and downwardly therefrom beneath the operator's platform 23. Rigidly secured on the forward end portions of each pair of the arms 24 is a metallic plate 25 which extends forwardly beneath the supporting structure 13. Each of the plates 25 has formed therein a longitudinally extending slot 26 (see Figures 7 and 8) for the passage of a rod 27 having a plate supporting head 28 on its lower end and having its upper end operatively connected to a manually operable bell crank lever 29 which is mounted for swinging movement on the platform 23 through the medium of a link 30. Each of the bell crank levers 29 is provided with a suitable keeper 31 for engagement with a toothed segment 32 mounted on the platform 23 for maintaining the levers 29 in adjusted position. Each of the plates 25 is further provided with a pair of holes 33 forwardly of the slot 26 for the passage of suitable securing elements for rigidly mounting a forwardly and upwardly extending bracket 34 in position on the plate 25. The brackets 34 are provided with vertically disposed bearings 35 on their horizontally disposed upper portions in which are journaled the reduced upper end portions of castings 36 having annular flanges on their lower ends to the lower sides of which flanges are secured the annular toothed cutters 37, one of which is illustrated in detail by Figure 9 of the drawings. The cutters 37 rest on the plates 25. The castings 36 are provided with vertical, centrally disposed, polygonal bores for slidably receiving a polygonal shaft section 38 and the plates 25 are each provided with an opening 29 in vertical alignment with the bores in the castings 36 for the passage of the shaft sections 38 when the plates 25 are swung upwardly. The driving means for the shaft sections 38 will be presently described. A finger plate 40 of comparatively hard metal is rigidly mounted on the forward end portion of each of the plates 25 and projects forwardly therefrom.

Each of the plates 25 is still further provided with a hole 41 for receiving the reduced lower end portion of an upstanding post 42. The reduced lower end portion of the post 42 is threaded into the hole 41, as best seen in Figure 10 of the drawings. Each of the posts 42 is provided with a series of vertically spaced openings for the reception of the rear end portions of the guards 43 having curved forward end portions 44 disposed forwardly of the castings 36. Set screws 45 are threaded into the posts 42 for engagement with the guards 43 for adjustably securing said guards 43 in adjusted position on the posts 42. As best seen in Figure 7 of the drawings, the guards 43 which are associated with each of the castings 36 are stepped rearwardly from the uppermost thereof to the lowermost thereof to permit the lower portions of the bean stalks to pass between the fingers of the members 40 for engagement by the teeth of the cutters 37 while putting the upper portions of the bean stalks away from the cutting mechanism. In Figure 7 of the drawings, the reference numeral 46 designates transverse bars which extend between the uprights 14 of the supporting structure 13, said bars 46 constituting a part of the supporting structure. The cutting units are designated generally by the reference numeral 47.

As before stated, each of the cutting units 47 is adapted to be elevated independently of the other cutting units through the medium of the levers 29 mounted on the platform 23. For elevating or adjusting the cutting units 47 simultaneously and uniformly a mechanism is provided which includes a pair of longitudinally extending angular arms 48 which are pivotally mounted for swinging movement on the end portions of the conveyor drive shaft 20 adjacent the inner sides of the longitudinal members 2 of the frame 1. A transversely extending, substantially U-shaped hanger 49 extends beneath the plates 25 for engagement with said plates and has its ends pivotally connected to the free end portions of the angular arms 48. The angular arms 48 rest on a crank 50 which is disposed transversely of the frame 1 and is provided with the trunnions 51 (see Figure 18) which are journaled in the side members 2 of the frame 1. One of the trunnions 51 projects laterally from the adjacent side members 2 of the frame 1 and has fixed thereon an actuating lever 52 having a conventional latch 53 thereon for engagement with a toothed segment 54 mounted on the frame 1 for retaining the lever 52 in adjusted position. As will be seen the crank 50 extends beneath the intermediate portions of the arms 48. By rocking the crank 50 through the medium of the lever 52, the arms 48 will be swung in a vertical plane to raise and lower the cutting units 47 simultaneously through the medium of the hanger 49.

A transverse shaft 55 of polygonal cross section has its end portions journaled in suitable bearings 56 on the forward end portions of the longitudinal members 18 of the supporting structure 13. Transversely aligned bearings 57 are mounted on the longitudinal members 19 of the supporting structure 13 and journaled for rotation in the bearings 57 are the double beveled gears which, as illustrated to advantage in Figure 14 of the drawings, are designated generally by the reference numeral 58 and comprise a sleeve 59 having a polygonal bore 60 extending longitudinally therethrough and further having the gears 61 on the opposite ends thereof. The polygonal bore 60 is for the passage of the polygonal shaft 55 for operatively connecting the gears 58 to said shaft for actuation thereby. Supporting brackets 62 (see Figures 1 and 2) extend laterally from the longitudinal members 19 rearwardly of the polygonal shaft 55 and are provided with longitudinally disposed bearings 63 in which double beveled gears 64 are journaled, said double gears 64 being identical to that shown in Figure 14 of the drawings. One gear of each of the double gears 64 is in mesh with one of the gears 61 of the double gears 58 and the other gear of the double gears 64 is in mesh with the uppermost gear of a vertically disposed double beveled gear 65 which is journaled for rotation in a rearwardly disposed extension 66 provided on each of the brackets 62, a suitable bearing being provided at the rear end of each of the extensions 66. It may be well to here state that double gears are provided on the polygonal shaft 55 and on the extensions 66 in order that the same may be interchanged with the gears 64 on the brackets 62. A vertically disposed polygonal shaft 67 extends through the polygonal bore of the double gears 65 and has its lower end operatively connected by a universal joint 68 with the upper end of the shaft section 38. A chain and sprocket connection 69 operatively connects the polygonal shaft 55 to the axle 8 for actuation by said axle.

Referring now to Figures 1, 3, 4 and 5 of the drawings it will be seen that a transverse bar 70 has its ends supported by brackets 71 on the longitudinal side members 2 of the frame 1 beneath the supporting structure 13. Arms 72 extend horizontally and rearwardly from the rear side of the bar 70 and rotatably supports a horizontal shaft 73, the arms 72 having bearings on their free ends in which the shaft 73 is journaled. Hangers 74 are mounted for vertical adjustment on the bar 70 adjacent each of the cutting units 47 through the medium of vertical slots 75 which are provided for the passage of bolts or the like 76 which extend forwardly from the forward side of the bar 70 and have nuts 77 threaded thereon for securing the hangers 74 in adjusted position. A horizontally disposed longitudinally extending sleeve 78 extends through the lower portion of each of the hangers 74 and journaled therein is a forwardly extending shaft 79 upon the forwardly extending portion of which a reel 80 is fixed. A beveled gear 81 is fixed on the rear end portion of each of the shafts 79. A bracket 82 extends rearwardly from a lower portion of each of the hangers 74 and rotatably supports a vertically disposed shaft section 83 having a beveled gear 84 fixed on its lower end portion in mesh with the gear 81 of the adjacent shaft 79. Each of the shaft sections 83 is provided with a polygonal bore for the reception of the polygonal lower end portion of the shaft sections 85 in a manner to provide a sliding connection, the shaft sections 85 being rotatably supported in the brackets 86 which extend rearwardly from the bar 70. Beveled gears 87 are fixed on the upper end portions of the shaft sections 85 and mesh with beveled gears 88 fixed on the shaft 73. As seen in Figure 4 of the drawings, the gears 84 are engaged with two of the gears 81 in a manner to rotate two of the reels 80 in a clockwise direction, as indicated by the arrows in Figure 3 of the drawings and the other gear 81 is engaged by its respective gear 84 in a manner to drive the other of the reels 80 in a counter-clockwise direction. A chain and sprocket connection 89 operatively connects the shaft 73 to the polygonal shaft 55 for actuation.

The portions 3 of the frame 1 of the machine extend rearwardly and upwardly and terminate in spaced opposed arcuate end portions 91 which are secured to the opposite sides of the lower portions of a vertically disposed cylinder 92 which constitute an essential element of a shocker which is designated generally by the reference numeral 93. At its upper end the cylinder 92 has formed integrally thereon a flared mouth or funnel 94 and mounted for horizontal longitudinal sliding movement in the upper and lower end portions of the cylinder 92 are the slide plates 95 and 96, respectively. Braces 97 have their forward end portions secured to the longitudinal side portions 2 of the frame 1 and have intermediate portions secured to opposite sides of an intermediate portion of the cylinder 92, said braces 97 extending rearwardly of the cylinder 92 in converging relation to each other and pivotally supporting between their rear end portions a rocker arm 98 having its ends operatively connected to the rear ends of the slide plates 95 and 96 by suitable pin and slot connections 99. A bracket 100 extends rearwardly from one of the portions 3 of the frame 1 and pivotally supports a lever 101 which has one end operatively connected to the rocker arm 98 by an angular link 102. The bracket 100 is connected to the lever 101 at an intermediate portion of said lever. A rod 103 operatively connects the other end of the lever 101 with a hand lever 104 which is mounted for swinging movement on the platform 23 and which is provided with latching means engageable with a toothed segment 105 for releasably retaining the lever 104 in swinging movement. It will thus be seen that, upon actuation of the lever 104, the slide plates 95 and 96 may be alternately shifted to operative and inoperative position. The shaft 20 supports the upper ends of a pair of lower conveyors or elevators 106 and also constitutes means for actuating said conveyors or elevators. The conveyors 106 extend forwardly and downwardly from the shaft 20 between the cutting units 47 and have mounted on their lower ends the pans 107 which are disposed substantially in transverse alignment with the reels 8. The upper ends of the conveyors 106 are disposed above the lower portions of a main conveyor or elevator 108 which is driven by the shaft 20 through the medium of a suitable chain and sprocket connection 109. An intermediate support 110 is provided for the main conveyor 108 and the upper end of said main conveyor 108 is disposed above the mouth or funnel 94 on the cylinder 92. Suitable brackets 111 may be provided for securing the lower end of the main conveyor 108 to upper portions of the conveyors 106 (see Figure 20).

As seen in Figure 19 of the drawings, the conveyor 19 comprises a panel 112 disposed between the longitudinal, vertically disposed side walls 113. Endless chains 114 travel between the side walls 113 over suitable sprockets at the ends of the conveyor and having secured thereto at spaced points, transverse scraper blades 115 which engage the upper surface of the plate 112 when traveling from the lower to the upper end of the conveyor for carrying any matter which may be deposited on the conveyor from the conveyors 106 upwardly. The conveyors 106 are substantially similar in construction.

In use, the machine is moved forwardly over the ground and the guards 43 by reason of the stepped arrangement of the curved portions 44 from the uppermost to the lowermost of said guards, will push the upper portions of the clamps or bean stalks forwardly away from the cutting mechanism but will permit the lower portions thereof to pass between the fingers of the finger plate 50 and be severed by the rotary cutters 37. The adjacent reels 80 which are turning in clockwise and counter-clockwise directions, respectively, will throw the cut bean stalks on one of the pans 107 to be carried upwardly by the corresponding conveyor 106 and the other of the reels 80 which is rotated in a clockwise direction will throw the cut stalks on the other of the pans 107 to be carried upwardly by the other of the conveyors 106. From the conveyors 106, as will be apparent, the stalks are dropped on to the main conveyor 108 and are carried upwardly and deposited in the flared mouth or funnel 94 of the cylinder 92. The slide plate 95 is normally disposed in open position to permit the cylinder 92 to be filled, the slide plate 96, of course, being closed at this time to close the lower end of the cylinder 92. When the cylinder 92 has been filled, the lever 104 on the platform 23 is actuated to move the slide plate 95 inwardly to close the top of the cylinder 92 and simultaneously move the slide plate 96 outwardly to open the bottom of the cylinder 92 and thus deposit the shock. When the upper end of the cylinder 92 is closed by the slide plate 95, the stalks are deposited in the flared mouth or funnel 94 from the main conveyor 108. As before stated, the cutting units 47 may be elevated or adjusted independently by levers 29 or simultaneously through the medium of the lever 52.

It is believed that the many advantages of a machine made in accordance with this invention will be readily understood, and although the preferred embodiment of the invention is as illustrated and described, it is to be understood that changes in the details of construction may be had which will fall within the scope of the invention as claimed.

What is claimed as new is:—

1. A harvesting machine comprising a frame, an axle journaled in the frame, supporting wheels mounted on the axle and operatively connected thereto for driving said axle, a shaft journaled transversely in the frame, means operatively connecting the shaft to the axle for actuation thereby, a plurality of cutting units mounted for swinging adjustment in a vertical plane on the shaft, inclined conveyors operatively connected with the shaft for actuation thereby, said conveyors extending between the cutting units, means operatively connecting the cutting units to the axle for actuation by said axle, reels rotatably mounted forwardly of the cutting units and adapted to throw the cut plants laterally on to the conveyors, and means operatively connecting the reels to the axle for actuation by said axle.

2. A harvesting machine comprising a frame, an axle journaled in the frame, supporting wheels mounted on the axle and operatively connected thereto for driving said axle, a shaft journaled transversely in the frame, means operatively connecting the shaft to the axle for actuation thereby, a plurality of cutting units mounted for swinging adjustment in a vertical plane on the shaft, inclined conveyors operatively connected with the shaft for actuating thereby, said conveyors extending between the cutting units, means operatively connecting the cutting units to the axle for actuation by said axle, reels rotatably mounted forwardly of the cutting units and adapted to throw the cut plants laterally on to the conveyors, means operatively connecting the reels to the axle for actuation by said axle, a platform mounted transversely on the frame, and means for adjusting the cutting units vertically relative to the ground, the last named means comprising a pair of arms pivotally mounted for swinging movement on the frame, a substantially U-shaped hanger pivotally suspended from the free end portions of the arms and extending transversely beneath the cutting units, said hanger supporting the forward portions of the cutting units, a crank journaled transversely in the frame and extending beneath the arms, said crank constituting supporting means for the forward portions of the arms, and an actuating lever fixed to the crank.

3. A harvesting machine comprising a frame, an axle journaled in the frame, supporting wheels mounted on the axle and operatively connected thereto for driving said axle, a shaft journaled transversely in the frame, means operatively connecting the shaft to the axle for actuation thereby, a plurality of cutting units mounted for swinging adjustment in a vertical plane on the shaft, inclined conveyors operatively connected with the shaft for actuation thereby, said conveyors extending between the cutting units, means operatively connecting the cutting units to the axle for actuation by said axle, reels rotatably mounted forwardly of the cutting units and adapted to throw the cut plants laterally on to the conveyors, means operatively connecting the reels to the axle for actuation by said axle, a shocker mounted on one end portion of the frame, an inclined conveyor having one end portion disposed beneath the first named conveyors and its other end disposed above the shocker in a manner to receive material from the first named conveyors and discharge said material into the shocker, and means operatively connecting the second named conveyor to the shaft for actuation by said shaft.

4. A harvesting machine comprising a frame, an axle journaled transversely in the frame, supporting wheels mounted on the axle and operatively connected thereto for driving said axle, a shaft journaled transversely in the frame, means operatively connecting the shaft with the axle for actuation thereby, a plurality of cutting units mounted for swinging adjustment in a vertical plane on the shaft, each cutting unit comprising a pair of arms pivotally mounted on the shaft, a plate rigidly secured to the free end portions of the arms, a finger plate rigidly mounted on one end portion of the first named plate, a bracket mounted on the first named plate and extending upwardly therefrom, a bearing on the free end portion of the bracket, a casting journaled in the bearing and having a polygonal bore extending vertically therethrough, an annular toothed cutter fixed on the lower side of the casting and engaged on the first named plate, said cutter coacting with the fingers on the second named plate to cut plants, a polygonal shaft extending into the bore in the casting for actuating said casting, and means operatively connecting the polygonal shaft to the axle for actuation by said axle.

5. A harvesting machine comprising a frame, an axle journaled transversely in the frame, supporting wheels mounted on the axle and operatively connected thereto for driving said axle, a shaft journaled transversely in the frame, means operatively connecting the shaft with the axle for actuation thereby, a plurality of cutting units mounted for swinging adjustment in a vertical plane on the shaft, each cutting unit comprising a pair of arms pivotally mounted on the shaft, a plate rigidly secured to the free end portions of the arms, a finger plate rigidly mounted on one end portion of the first named plate, a bracket mounted on the first named plate and extending upwardly therefrom, a bearing on the free end portion of the bracket, a casting journaled in the bearing and having a polygonal bore extending vertically therethrough, an annular toothed cutter fixed on the lower side of the casting and engaged on the first named plate, said cutter coacting with the fingers on the second named plate to cut plants, a polygonal shaft extending into the bore in the casting for actuating said casting, means operatively connecting the polygonal shaft to the axle for actuation by said axle, a platform mounted transversely on the frame, bell crank levers mounted for manual actuation on the platform, rods loosely connected to the first named plates, and links operatively connecting the rods to the bell crank levers, said rods, links and bell crank levers constituting means for adjusting the cutting units independently relative to the ground.

In testimony whereof I affix my signature.

WILLIAM FRED LONBECK.